(12) United States Patent
Dorsey et al.

(10) Patent No.: US 8,412,105 B2
(45) Date of Patent: Apr. 2, 2013

(54) ELECTRONIC DEVICES WITH RADIO-FREQUENCY COLLISION RESOLUTION CAPABILITIES

(75) Inventors: John Gregory Dorsey, San Francisco, CA (US); William C. Athas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1117 days.

(21) Appl. No.: 11/986,892

(22) Filed: Nov. 26, 2007

(65) Prior Publication Data

US 2009/0138745 A1 May 28, 2009

(51) Int. Cl.
*H04B 15/00* (2006.01)

(52) U.S. Cl. ......... 455/63.3; 455/501; 455/515; 455/72; 455/67.13; 713/501; 375/346; 375/347

(58) Field of Classification Search ................. 455/63.3, 455/501, 515, 72, 67.13; 713/501; 375/346, 375/347
See application file for complete search history.

(56) References Cited

U.S. PATENT DOCUMENTS

| | | | |
|---|---|---|---|
| 4,507,796 A | 3/1985 | Stumfall | |
| 5,559,459 A | 9/1996 | Back et al. | |
| 5,610,955 A | 3/1997 | Bland | |
| 5,812,590 A | 9/1998 | Black et al. | |
| 5,909,144 A | 6/1999 | Puckette et al. | |
| 6,512,402 B2 | 1/2003 | Ravid et al. | |
| 6,629,256 B1 * | 9/2003 | Ilan et al. | 713/501 |
| 6,687,319 B1 | 2/2004 | Perino et al. | |
| 6,759,909 B2 | 7/2004 | Hughes et al. | |
| 7,193,596 B2 | 3/2007 | Shibata et al. | |
| 7,209,746 B1 * | 4/2007 | Kirino et al. | 455/450 |
| 2002/0142724 A1 * | 10/2002 | Nakano | 455/62 |
| 2003/0100280 A1 * | 5/2003 | Kusbel et al. | 455/182.1 |
| 2003/0130793 A1 * | 7/2003 | Patwari et al. | 701/300 |
| 2003/0198307 A1 * | 10/2003 | Neill et al. | 375/346 |
| 2004/0204026 A1 * | 10/2004 | Steer et al. | 455/550.1 |
| 2005/0013275 A1 * | 1/2005 | Black et al. | 370/329 |
| 2005/0018631 A1 * | 1/2005 | Sivakumar et al. | 370/329 |
| 2005/0197768 A1 * | 9/2005 | Kaikuranta et al. | 701/213 |
| 2005/0246099 A1 * | 11/2005 | Jendbro et al. | 701/216 |
| 2005/0255881 A1 * | 11/2005 | Yamamoto et al. | 455/556.1 |
| 2006/0057970 A1 * | 3/2006 | Kusbel et al. | 455/69 |
| 2007/0009067 A1 * | 1/2007 | Michalak | 375/346 |
| 2007/0027809 A1 * | 2/2007 | Alve | 705/51 |
| 2007/0081485 A1 * | 4/2007 | Li | 370/328 |
| 2007/0111756 A1 * | 5/2007 | Reed | 455/556.1 |
| 2007/0142055 A1 * | 6/2007 | Toivanen et al. | 455/450 |
| 2007/0152766 A1 * | 7/2007 | Herrin et al. | 331/1 A |
| 2007/0208964 A1 * | 9/2007 | Sandon et al. | 713/501 |
| 2007/0211819 A1 * | 9/2007 | Greenberg | 375/295 |
| 2007/0239914 A1 * | 10/2007 | Horowitz et al. | 710/104 |
| 2008/0011841 A1 * | 1/2008 | Self et al. | 235/385 |
| 2008/0085722 A1 * | 4/2008 | Hirano et al. | 455/452.1 |
| 2008/0240313 A1 * | 10/2008 | Deisher et al. | 375/346 |
| 2010/0328804 A1 * | 12/2010 | Yamashita et al. | 360/51 |

\* cited by examiner

*Primary Examiner* — Nay A Maung
*Assistant Examiner* — Erica Fleming-Hall
(74) *Attorney, Agent, or Firm* — Treyz Law Group; G. Victor Treyz; Jason Tsai

(57) ABSTRACT

Electronic devices such as portable electronic devices contain electronic components. The electronic components may include radio-frequency transceiver circuitry. The radio-frequency transceiver circuitry may be used for handling data communications and cellular telephone voice communications. One or more adjustable clock sources may be provided within the electronic device. The adjustable clock sources may be based on phase-locked-loop circuits. A clock manager may determine which frequencies are being used by the radio-frequency transceiver circuitry and other components in the electronic device. The clock manager may use this information to compute a list of safe fundamental clock signal frequencies. Based on the list of safe clock signal frequencies, the clock manager may dynamically adjust the clock sources to avoid collisions between harmonics of the clock signals from the clock sources and the frequencies used by the transceiver circuitry and other components.

16 Claims, 11 Drawing Sheets

ELECTRONIC DEVICES WITH RADIO-FREQUENCY COLLISION RESOLUTION CAPABILITIES

BACKGROUND

This invention relates to adjusting clocks in electronic devices to avoid collisions between undesirable clock frequency harmonics and signal frequencies that are being used by radio-frequency (RF) transceivers or other device components.

Electronic devices are often provided with wireless communications capabilities. For example, handheld electronic devices may use long-range wireless communications to communicate with wireless base stations. Handheld electronic devices such as cellular telephones may communicate using cellular telephone bands at 850 MHz, 900 MHz, 1800 MHz, and 1900 MHz. Electronic devices may also use short-range wireless communications links. For example, electronic devices may communicate in unlicensed bands using the IEEE 802.11 standard (2.4 GHz and 5 GHz) or Bluetooth® (2.4 GHz). Communications are also possible in data service bands such as the 3G data communications band at 2100 MHz that is used by the Universal Mobile Telecommunications System (UMTS). Devices with Global Positioning System (GPS) capabilities receive GPS signals at frequencies such as 1575 MHz.

Devices that operate in cellular telephone and wireless data communications bands include radio-frequency transceiver circuits. These circuits, which are sometimes referred to as radios, may be used to handle transmitted and received signals in one or more radio-frequency bands of interest.

Electronic devices also have other components such as displays, processors, and memory. Clock circuits are used to distribute a common time reference to these components. For example, a crystal oscillator may be used to generate a reference clock signal. Clock circuitry may be used to create clock signals such as square waves from the output of the crystal oscillator. For example, a phase-locked loop circuit may be used to create a clock signal at a multiple of the crystal oscillator's frequency.

A clock that operates at a given frequency f may produce signals at harmonic frequencies (e.g., fundamental harmonic f and higher order harmonics 2f, 3f, 4f, 5f, etc.). In a given electronic device, these harmonic frequencies may overlap with the frequencies of other signals in the device such as the frequencies used by radio-frequency transceiver circuitry. If care is not taken to properly isolate these overlapping signals, the device may not operate properly.

For example, the Digital Visual Interface (DVI) protocol is a display interface that is commonly used to drive digital displays such as liquid crystal display (LCD) monitors. In DVI signals, red, green, and blue pixel data and a clock are differentially encoded. For a standard timing, an LCD monitor with a 1920×1200 pixel resolution that operates at 60 Hz with a reduced blanking interval has a pixel clock that operates at 154 MHz. The 16th harmonic of this signal is centered around 2.464 GHz, which is close to the center frequency of IEEE 802.11 channel 11 at 2.462 GHz. If the DVI clock at 154 MHz is not well isolated from the radio-frequency transceiver used for the IEEE 802.11 signals, the 16th harmonic of the DVI clock will collide with IEEE 802.11 signals on channel 11. Adjacent channels may also be affected. As a result of the signal collision, a user may experience reduced throughput at a given range or communications using the desired frequency (channel 11 in this example) may not be possible.

As a result of the potential for undesirable signal collisions, extensive consideration is given to proper electromagnetic shielding in modern electronic devices. This typically entails providing additional electronic components in a device whose purpose is to reduce the impact of signal collisions. For example, certain components may be electromagnetically shielded by mounting the components within conductive enclosures. Signal interference can also be minimized by using filter networks.

These schemes generally help to reduce signal collisions between clock sources and component operating frequencies. Nevertheless, there can be severe penalties associated with shielding schemes. Metal enclosures consume valuable space and add cost and complexity to a device. Particularly in small-form-factor devices, there may be insufficient space for a conductive enclosure. Filtering components may add undesirable cost to a design and must be carefully selected to avoid adversely affecting device reliability.

It would therefore be desirable to provide ways in which to reduce the adverse impact of potential signal collisions in electronic devices with wireless communications circuitry.

SUMMARY

Electronic devices are provided that contain electronic components and adjustable clock circuitry. A clock manager may be implemented on circuitry within an electronic device. The clock manager may dynamically adjust the clock circuitry to prevent frequency collisions between clock signal harmonics and the operating frequencies of the electronic components.

The electronic device may be a handheld electronic device such as a handheld electronic device with cellular telephone capabilities. The handheld electronic device may contain radio-frequency transceiver circuits. Each transceiver may handle communications in a different communications band. During operation, the clock manager may identify which ranges of frequencies may be used by the transceivers. The clock manager may also identify regional regulatory constraints (e.g., constraints based on the location of the device). Based on the identified operating frequencies and the regulatory constraints (e.g., constraints based on device location), the clock manager may identify safe clock frequencies. The clock manager may then adjust adjustable clock sources in the handheld electronic device to place the fundamental harmonics of clock signals in the device within safe fundamental frequency ranges. This prevents overlap between clock harmonics and the desired operating frequencies of the radio-frequency transceivers and other components in the handheld electronic device.

Further features of the invention, its nature and various advantages will be more apparent from the accompanying drawings and the following detailed description of the preferred embodiments.

DETAILED DESCRIPTION

The present invention relates generally to electronic devices, and more particularly, to electronic devices in which clock signals that may potentially cause undesirable signal interference are adjusted using adjustable clock sources. The adjustable clock sources may include adjustable clock generation circuits based on circuits such as adjustable phase-locked loops and/or adjustable clock relay circuits (e.g., dividers).

The electronic devices in which the clock signals are adjusted may be any suitable type of electronic equipment. For example, the electronic devices may include computers such as laptop computers, desktop computers, computers that are integrated into computer monitors, processing equipment that is part of a set-top box, handheld computers, etc. The electronic devices may have wireless communications circuitry or may not have wireless communications circuitry. Electronic devices that include wireless communications circuitry ("wireless electronic devices") are sometimes described herein as an example. This is, however, merely illustrative. Clock signals may be adjusted to avoid signal interference in any suitable electronic devices that contains clocks and other signals. Wireless electronic devices are merely described herein as an example.

Wireless electronic devices may or may not be portable. An example of a wireless electronic device that may not be considered portable is a large computer with a wireless card. Examples of wireless electronic devices that may be considered portable are portable electronic devices such as laptop computers or small portable computers of the type that are sometimes referred to as ultraportables.

Portable electronic devices may also be somewhat smaller devices. Examples of smaller portable electronic devices include wrist-watch devices, pendant devices, headphone and earpiece devices, and other wearable and miniature devices. With one suitable arrangement, which is sometimes described herein as an example, the portable electronic devices are handheld electronic devices.

The handheld devices may be, for example, cellular telephones, media players with wireless communications capabilities, handheld computers (also sometimes called personal digital assistants), remote controllers, global positioning system (GPS) devices, and handheld gaming devices. The handheld devices may also be hybrid devices that combine the functionality of multiple devices of these types. Examples of hybrid handheld devices include a cellular telephone that includes media player functionality, a gaming device that includes a wireless communications capability, a cellular telephone that includes game and email functions, and a handheld device that receives email, supports mobile telephone calls, has music player functionality and supports web browsing. These are merely illustrative examples.

Figure 1:
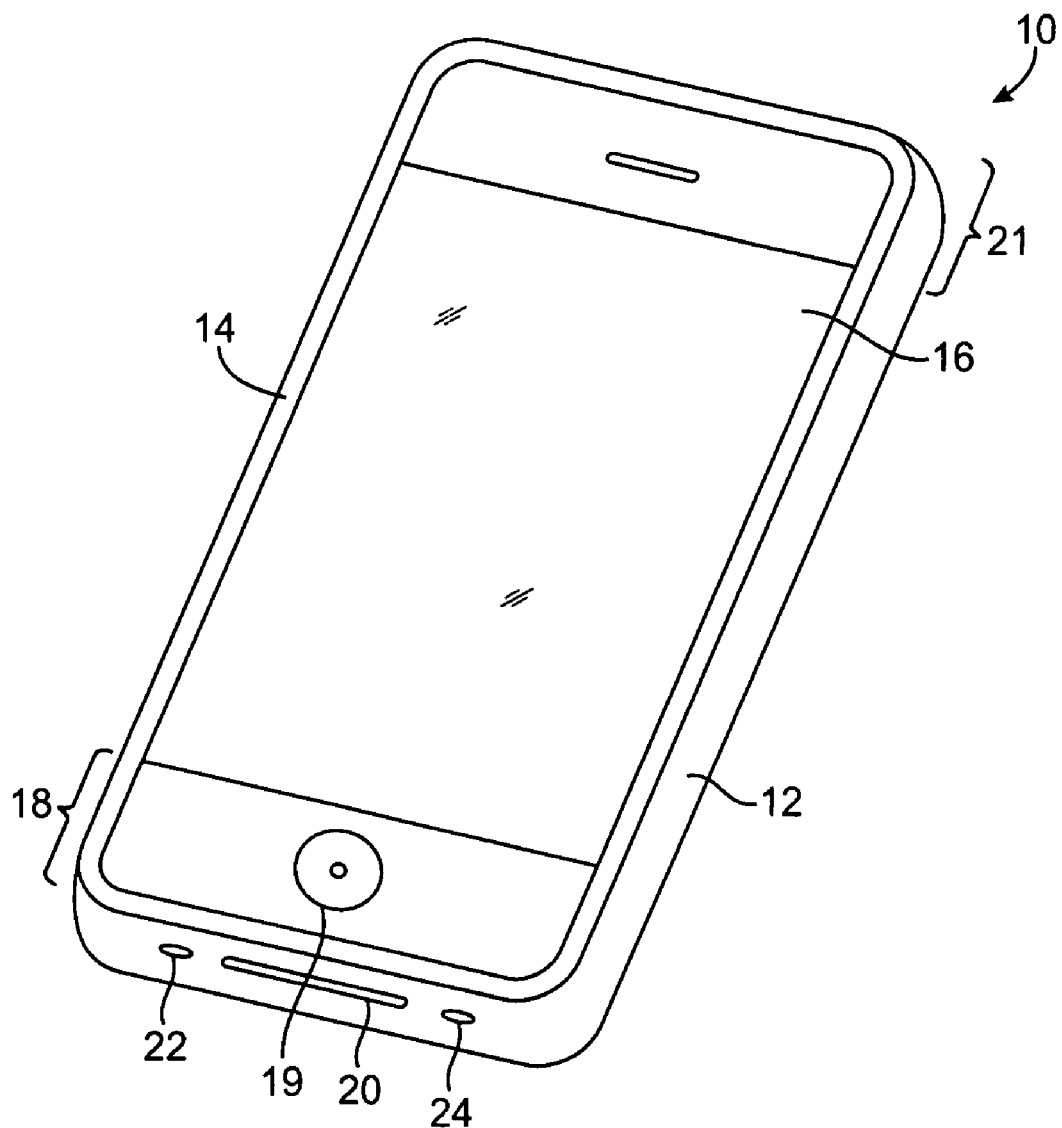
FIG. 1 is a perspective view of an illustrative handheld electronic device in accordance with an embodiment of the present invention.

An illustrative handheld electronic device in accordance with an embodiment of the present invention is shown in FIG. 1. Device 10 may be any suitable portable or handheld electronic device.

Device 10 may have housing 12 and may include one or more antennas for handling wireless communications. Device 10 may handle communications over multiple communications bands. For example, wireless communications circuitry in device 10 may be used to handle cellular telephone communications in one or more frequency bands and data communications in one or more communications bands.

Device 10 may, for example, have an antenna that handles communications in a 2.4 GHz communications band (e.g., IEEE 802.11 and/or Bluetooth frequencies). The same antenna or a separate antenna may be used to receive Global Positioning Systems (GPS) communications at 1575 MHz. One or more antennas may also be provided for handling cellular telephone communications bands and/or 3G data communications bands such as the Universal Mobile Telecommunications System (UMTS) 3G data communications band at 2170 MHz (as examples).

Housing 12 may be formed of any suitable materials including plastic, glass, ceramics, metal, other suitable materials, or a combination of these materials. Housing 12 may have a bezel 14 that serves to hold display 16 to housing 12. Display 16 may be a liquid crystal diode (LCD) display or other suitable display. If desired, handheld electronic device 10 may have other input-output devices. For example, handheld electronic device 10 may have user input control devices such as button 19, and input-output components such as port 20 and one or more input-output jacks (e.g., for audio and/or video). Openings 24 and 22 may, if desired, form microphone and speaker ports.

Handheld electronic device 10 may have one or more antennas. For example, handheld electronic device may have a first antenna that is located in the upper end of device 10 in region 21 and a second antenna that is located in the lower end of device 10 in region 18. Additional antennas or only a single antenna may be used in device 10 if desired. Antennas can be shared or used individually.

For example, two or more radio-frequency (RF) transceivers (radios) may share a single antenna. This type of arrangement reduces the number of antennas that are required to support a given number of communications bands. For example, an antenna may be shared by IEEE 802.11 and Bluetooth® transceivers operating at 2.4 GHz. The two or more transceivers that share an antenna in this way may operate in a common communications band (e.g., 2.4 GHz) or may operate in multiple communications bands.

As another example, a radio-frequency transceiver circuit may be used to transmit data signals in a 3G data band through one antenna while a radio-frequency receiver may be used to receive GPS signals at 1575 MHz using another antenna. Additional antennas and corresponding transceivers may be used for local data bands (e.g., IEEE 802.11), cellular telephone signals, etc.

Arrangements in which some antennas are shared and some antennas are dedicated to use by respective transceivers may also be used in device 10.

Figure 2:
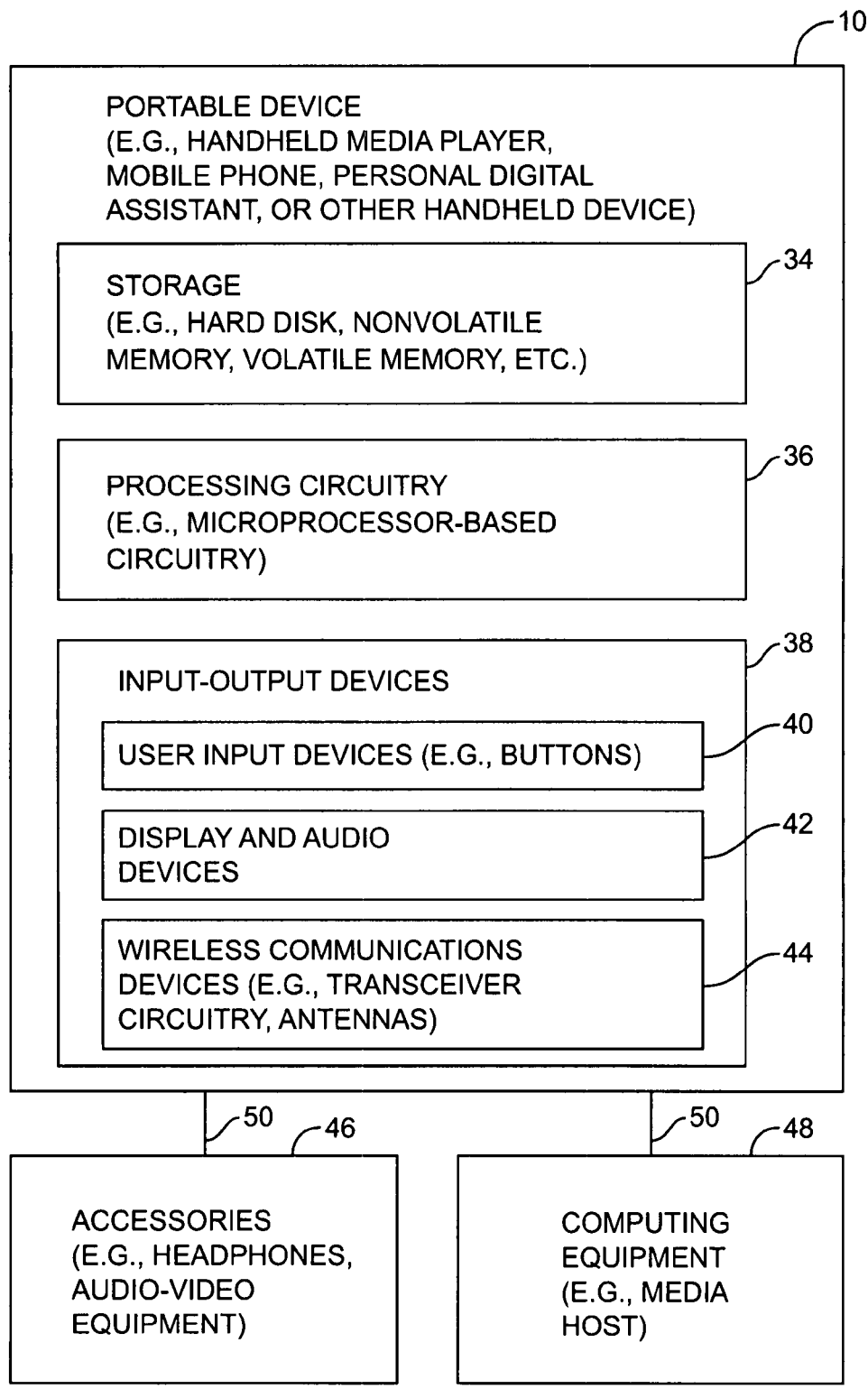
FIG. 2 is a schematic diagram of an illustrative handheld electronic device in accordance with an embodiment of the present invention.

A schematic diagram of an embodiment of an illustrative handheld electronic device is shown in FIG. 2. Handheld device 10 may be a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3G data services such as UMTS, Global Positioning System (GPS) protocols, cellular telephone communications protocols, etc.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications).

Device 10 can communicate with external devices such as accessories 46 and computing equipment 48, as shown by paths 50. Paths 50 may include wired and wireless paths. Accessories 46 may include headphones (e.g., a wireless cellular headset or audio headphones) and audio-video equipment (e.g., wireless speakers, a game controller, or other equipment that receives and plays audio and video content).

Computing equipment 48 may be any suitable computer. With one suitable arrangement, computing equipment 48 is a computer that has an associated wireless access point or an internal or external wireless card that establishes a wireless connection with device 10. The computer may be a server (e.g., an internet server), a local area network computer with or without internet access, a user's own personal computer, a peer device (e.g., another handheld electronic device 10), or any other suitable computing equipment.

The antenna structures and wireless communications devices of device 10 may support communications over any suitable wireless communications bands. For example, wireless communications devices 44 may be used to cover communications frequency bands such as the cellular telephone bands at 850 MHz, 900 MHz, 1800 MHz, and 1900 MHz, data service bands such as the 3G data communications band at 2100 MHz (commonly referred to as the UMTS or Universal Mobile Telecommunications System band), the IEEE 802.11 bands at 2.4 GHz and 5.0 GHz (also sometimes referred to as wireless local area network or WLAN bands), the Bluetooth® band at 2.4 GHz, and the global positioning system (GPS) band at 1575 MHz. The 850 MHz band is sometimes referred to as the Global System for Mobile (GSM) communications band. The 900 MHz communications band is sometimes referred to as the Extended GSM (EGSM) band. The 1800 MHz band is sometimes referred to as the Digital Cellular System (DCS) band. The 1900 MHz band is sometimes referred to as the Personal Communications Service (PCS) band. Each band may include one or more individual channels. For example, the IEEE 802.11 band may include individual channels, each of which can handle a separate set of wireless data communications. Device 10 can wirelessly communicate using RF frequencies in any such bands and channels.

If desired, device 10 can communicate using different bands or channels depending on circumstances. For example, device 10 may be configured to handle GSM bands appropriate for Europe when device 10 is located in Europe and may be configured to handle GSM bands appropriate for the United States when device 10 is located in the United States.

Device 10 may contain adjustable clock circuitry. For example, device 10 may contain one or more adjustable clock sources. Whenever the frequency of the clock sources has the potential to cause undesirable interference, the clock sources can be adjusted to prevent or minimize interference. Situations in which the signal frequencies that are associated with a particular clock source (i.e., its fundamental harmonic and its higher order harmonics) interfere with the signal frequencies of other clock sources or with the signal frequencies associated with other components are sometimes referred to as collisions. Collisions may be reduced by moving the clocks so that their harmonics do not coincide with frequencies of interest. Clock frequency adjustments may be made to avoid collisions with wireless signals (e.g., signals produced by or used by wireless transceiver circuitry operating in RF communications bands and channels of interest) or may be made to avoid collisions with other signals (e.g., non-wireless signals associated with audio circuits, non-wireless signals associated with video circuits, etc.).

The frequency bands that are used for wireless communications are often fixed by external requirements. For example, when a user of a handheld electronic device uses the device to communicate over a cellular telephone band, the frequencies of the cellular telephone signals that the handheld electronic device transmits and receives may be dictated by the frequencies at which the cellular telephone service provider's equipment operates. It is generally not possible in this type of scenario to modify the cellular telephone frequency (although in multiband systems it may be possible to choose among available bands). Because wireless RF signal frequencies are often restricted in this way, the desired wireless communications frequencies for a device may be considered to impose frequency constraints on the device (i.e., constraints that arise from a desire to communicate over particular RF communications bands).

On the other hand, clocks for other components (i.e., components other than the radios in device 10) may often be adjusted without preventing device 10 from operating. As an example, a clock associated with a microprocessor may be reduced below its nominal maximum value. Although a reduction in processor clock speed typically causes the processor to execute fewer instructions per unit time and thereby reduces processing performance, a processor with a reduced clock speed will still generally be able to function properly. Moreover, reducing the processor speed may help to reduce power consumption.

Circuits such as wireless radio frequency transceivers therefore generally have operating frequencies that cannot be readily adjusted without preventing the transceivers from being able to perform their intended functions. Circuits such as these are sometimes referred to as "victims" or "victim circuits." Circuits such as processors or other circuits that can perform their intended functions even when operating with a modified clock frequency but whose clocks produce signal harmonics that overlap and interfere with those of the victim circuits are sometimes referred to as aggressors. In a typical scenario, the victims are RF transceiver circuits and the aggressors are circuits such as processors and clocks that produce interfering harmonics. This is, however, merely illustrative. For example, victims and aggressors may include other circuits such as audio circuits, video circuits, memory circuits, control circuits, input-output circuits, display circuits, encoders, application-specific integrated circuits, microcontrollers, logic circuits that contain one or more circuit subblocks of these types, etc.

Device 10 preferably has software and/or hardware that implements control functions to reduce or eliminate frequency collisions by adjusting adjustable clock sources. This allows device 10 to move clock signal harmonics to portions of the frequency spectrum where they will not interfere with other signals. By reducing or eliminating frequency collisions, device performance can be improved and/or requirements for radio-frequency shielding or filtering can be relaxed. As an example, if a clock is adjusted so as to avoid interference with a cellular telephone band, it may be possible to reduce the amount of radio-frequency shielding that surrounds the transceiver for that band. Alternatively, using the same amount of shielding, RF transmitter and receiver performance can be improved due to decreased interference.

Device 10 can make adjustments statically (e.g., following testing when device 10 is manufactured or during a setup process) or device 10 can make adjustments dynamically (e.g., in real time in response to changing operating requirements). In a typical static adjustment scenario, the performance of device 10 may be measured (e.g., using internal testing capabilities in device 10 or using external testing equipment) to determine whether there are undesirable frequency collisions. If collisions are detected, the clocks associated with one or more adjustable clock sources may be adjusted. Storage such as hard drive or nonvolatile memory storage (e.g., laser-programmed fuses or electrically-programmable erasable programmable read-only memory) may be used to store a desired set of adjustable clock settings for the adjustable clock sources. During normal operation, the adjustable clock settings direct the adjustable clocks to produce clock signals that have reduced or minimized amounts of overlap with desired operating frequencies.

In a typical dynamic adjustment scenario, the operation of device 10 varies in real time and the clocks are adjusted accordingly. Examples of factors that may affect the operation of device 10 include the geographic location in which device 10 is operating, the mode of operation that a user has selected (e.g., which wireless transceivers have been enabled by a user, which wireless transceivers have been disabled by the user, which wireless transceivers are desired for use to handle communications, etc.). Device operation may also be affected by the current time (e.g., time of day, date, etc.), the software state of device 10 (e.g., which applications are running), the status of certain data (e.g., whether a particular email message has been transmitted, whether a file has been downloaded, whether a user has logged into a service, the state of policy settings such as settings adjusting whether device 10 is to be operated in a power saving mode or a performance mode, etc.), or hardware status information (e.g., battery charge level, whether a wireless transceiver card is present or not present in a card slot, the positions of buttons on device 10, etc.).

Based on factors such as these or other suitable factors, device 10 can make clock frequency adjustments. The clock frequency adjustments that are made may balance the needs of the components in device 10 against user settings and other criteria. For example, if a user has made settings adjustments that instruct device 10 to maximize power savings, the optimum or desired setting for the microprocessor clock in device 10 may be minimum value (i.e., a value that has been determined to provide a minimum acceptable level of performance). At the same time, however, this desired minimum clock value may produce a harmonic frequency that overlaps with a desired communications band. If the user has also enabled the radio for that communications band and desires to transmit data over that communications band, a conflict exists. In situations such as these, device 10 may decide which of these two criteria is more important. If, for example, the need to transmit data wirelessly is considered to be of primary importance (i.e., because this constraint can only be violated by making the wireless capabilities of device 10 inoperable), the clock rate for the processor may be increased. This will increase the rate of power consumption for device 10, but will preserve the ability of device 10 to function properly by preventing interference between the processor clock and the wireless functions of device 10.

Figure 3:
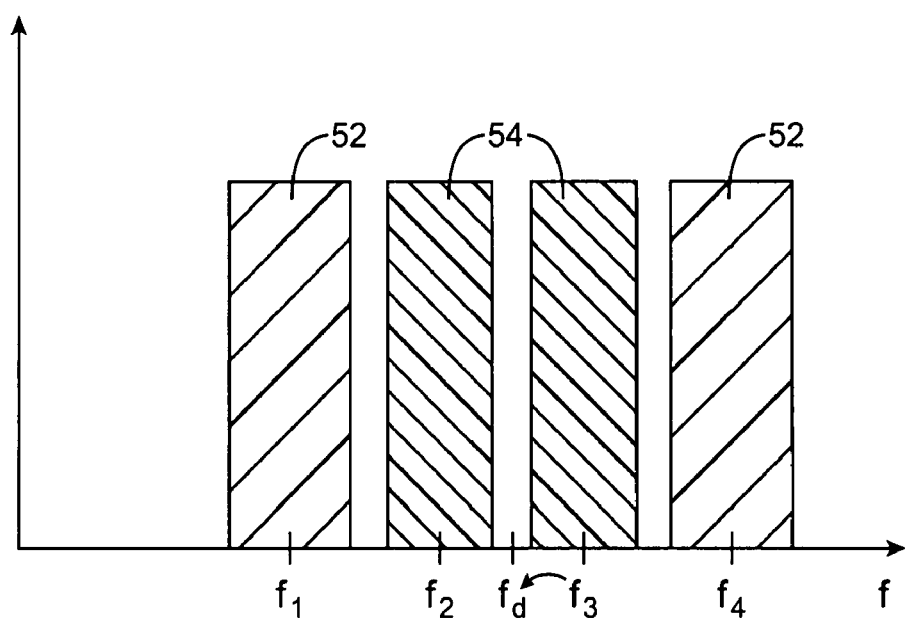
FIG. 3 is a graph showing how a clock harmonic frequency may be adjusted to avoid an undesirable signal collision in accordance with an embodiment of the present invention.

As an example of a dynamic clock adjustment that may be made in device 10, consider the situation in which device 10 contains cellular telephone transceivers that operate in frequency bands f1 and f4 when device 10 is operated in one location (e.g., in the United States) and that operate in frequency bands f2 and f3 when device 10 is operated in another location (e.g., Europe). The communications spectrum for this type of device is shown in FIG. 3. Bands 52 correspond to operation in one location, whereas bands 54 correspond to operation in another location. When the spectrum of bands 54 is required, the cellular telephone communications of device 10 can collide with a harmonic at f3 that is produced by an adjustable clock source. The clock harmonic may, for example, be associated with a processor clock.

When operating device 10 in the location in which the communications bands 52 are used, there is no conflict, because the clock harmonic at frequency f3 does not overlap with communications bands 52. In particular, the clock harmonic at frequency f3 does not overlap with the communications band at f1 or the communications band at f4. Because there is no collision between f3 and communications bands 52, device 10 can operate without risk of performance degradation due to frequency collisions.

When operating device 10 in the location in which communications bands 54 are used, there will be a conflict if the adjustable clock source is not adjusted. This is because the clock harmonic at frequency f3 lies in the center of the communications band at f3. To avoid the problems associated with overlapping frequencies, device 10 may adjust the adjustable clock source. After adjustment, the clock harmonic lies at frequency fd rather than frequency f3, so there is no conflict between the clock harmonic and the communications band of interest. Although the processor clock is reduced in speed somewhat with this type of scenario, the ability to avoid frequency collisions allows less shielding to be used in device 10 and/or improves performance in the band at f3.

Figure 4:
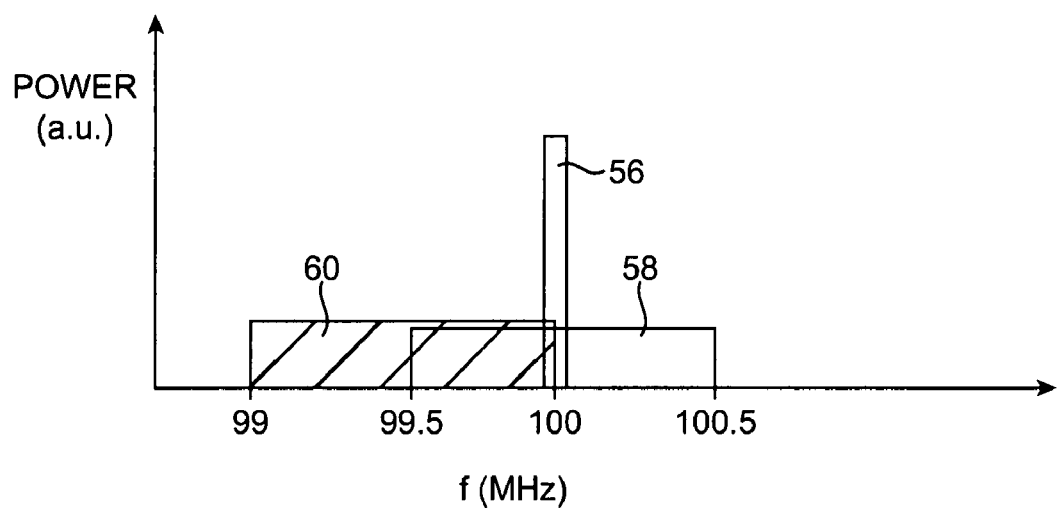
FIG. 4 is a graph showing how clock signals can be shifted in frequency and modulated to avoid signal collisions in accordance with an embodiment of the present invention.

In addition to, or instead of adjusting the clock source to move its fundamental frequency, device 10 may adjust how the clock source is modulated to help resolve frequency conflicts. As shown in FIG. 4, a clock source may have a fundamental frequency of 100 MHz (as an example). The fundamental clock frequency is represented by spectrum 56 in FIG. 4.

By modulating the clock source, the frequency spectrum may be spread out to cover a range of frequencies (i.e., frequencies from 99.5 MHz to 100.5 MHz as represented by spectrum 58). Clock source modulation may be performed using analog and/or digital modulation techniques. As an example, a clock source that is based on a phase-locked loop (PLL) may have a voltage controlled oscillator (VCO). In this type of configuration, the clock signal can be modulated by modulating the VCO circuit (e.g., its power supply voltage). As another example, a digital control signal may be applied to a multiplier, divider, or other digital circuit to modulate the clock source output frequency.

As shown in FIG. 4, in addition to applying a clock modulation profile to the clock source to broaden the clock signal's frequency spectrum (e.g., to form spectrum 58), the clock source's fundamental (center) frequency can be adjusted. In the example of FIG. 4 that is represented by spectrum 60, the clock signal has been modulated to broaden the spectrum and the center frequency of the clock signal has been adjusted so that the resulting clock signal spectrum covers a frequency range of 99.0 MHz to 100.0 MHz. Both frequency shifts and clock spectrum modifications may be made to minimize the effects of frequency collisions. Movement of the fundamental clock harmonic may help to avoid collisions entirely in some circumstances. In situations such as those in which collisions cannot be avoided entirely, it may be beneficial to spread the spectrum of the clock so that each frequency in the spectrum carries a reduced amount of signal power. This may help to minimize the impact of frequency collisions should they arise.

Figure 5:
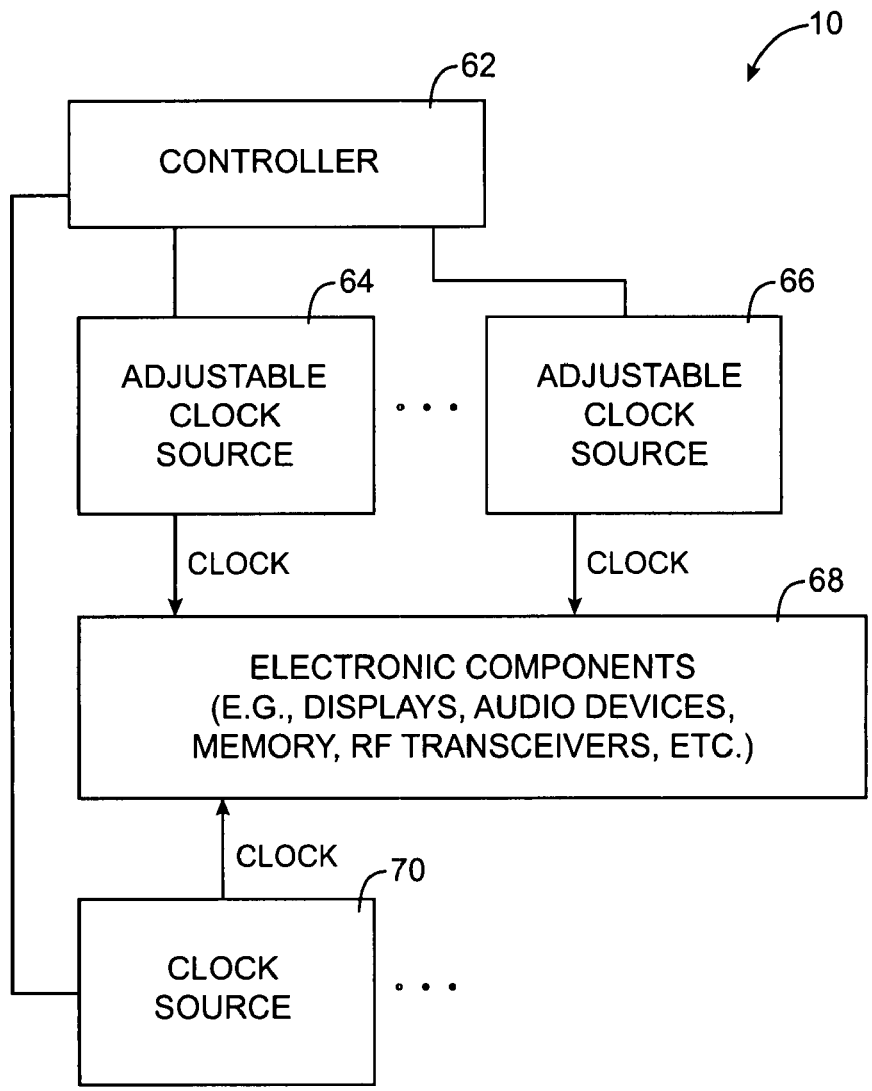
FIG. 5 is a diagram showing how clock sources in an electronic device may be adjusted in accordance with an embodiment of the present invention.

Illustrative circuitry that may be used in device 10 to control clock sources to help prevent undesirable frequency collisions is shown in FIG. 5. As shown in FIG. 5, device 10 may have a controller 62. Controller 62 may be implemented using hardware and/or software. For example, controller 62 may be implemented using processor 36 and storage 34 and other circuitry in FIG. 2 or may be implemented using more dedicated hardware. When controller 62 is implemented using software, the software may be stored on storage such as storage 34 of FIG. 2. When the software is run, the processing circuitry of device 10 such as processing circuitry 36 of FIG. 2 is configured to perform the clock adjustment control operations of controller 62.

Controller 62 may control clock sources such as clock source 64, 66, and 70. The amount of adjustability that is available for each clock source may vary.

For example, some clock sources (e.g., clock source 70) may only be capable of supplying a fixed output frequency. This output frequency may, for example, be a multiple of a reference clock input signal that is derived from a crystal oscillator or other oscillator circuit. With this type of configuration, controller 62 may be able to enable or disable the clock source as desired to avoid frequency collisions. However, this type of clock source does not have an adjustable frequency.

Other clock sources (e.g., adjustable clock source 64) may have a fixed clock modulation profile, but may have an adjustable fundamental frequency. Controller 62 may issue control signals for this type of clock source to adjust the fundamental frequency and/or to selectively enable or disable the clock source.

Still other clock sources (e.g., adjustable clock source 66) may have adjustable fundamental frequencies and adjustable modulation profiles (to spread the spectrum of the clock source as described in connection with FIG. 4). Controller 62 may selectively enable/disable this type of clock source, may adjust the fundamental clock signal frequency, and may apply a desired clock modulation profile to the clock source.

In general, each of these types of clocks, only one of these types of clocks, or other suitable clocks may be used in device 10. The arrangement of FIG. 5 is merely illustrative.

The clock sources of FIG. 5 generate clock signals at their outputs. These clocks are applied to electronic components 68 in device 10. Illustrative electronic components that use clock signals in device 10 include video circuits, displays, audio circuits, input-output devices, RF transceivers, etc.

The clock signals that are produced by the clock sources are labeled "CLOCK" in FIG. 5. These signals may be derived from one or more reference clock signals. The reference clock signals may be supplied by an oscillator that is mounted on the same circuit board or within the same housing as the other components in device 10 (as an example). A phase-locked-loop (PLL), delay-locked loop (DLL) or other suitable clock circuitry may be used to control each output signals CLOCK. In a typical scenario, the clock source circuitry is based on a PLL and contains one or more divider (multiplier) circuits. The divider circuits control the ratio of the output signal CLOCK relative to the input reference clock and thereby control the frequency of signal CLOCK. As an example, a reference clock input might have a frequency of 20 MHz. In a PLL with a divide-by-ten circuit in its feedback path, the clock signal output of the PLL would be multiplied by ten relative to the reference clock input to produce an output at a frequency of 200 MHz.

Figure 6:
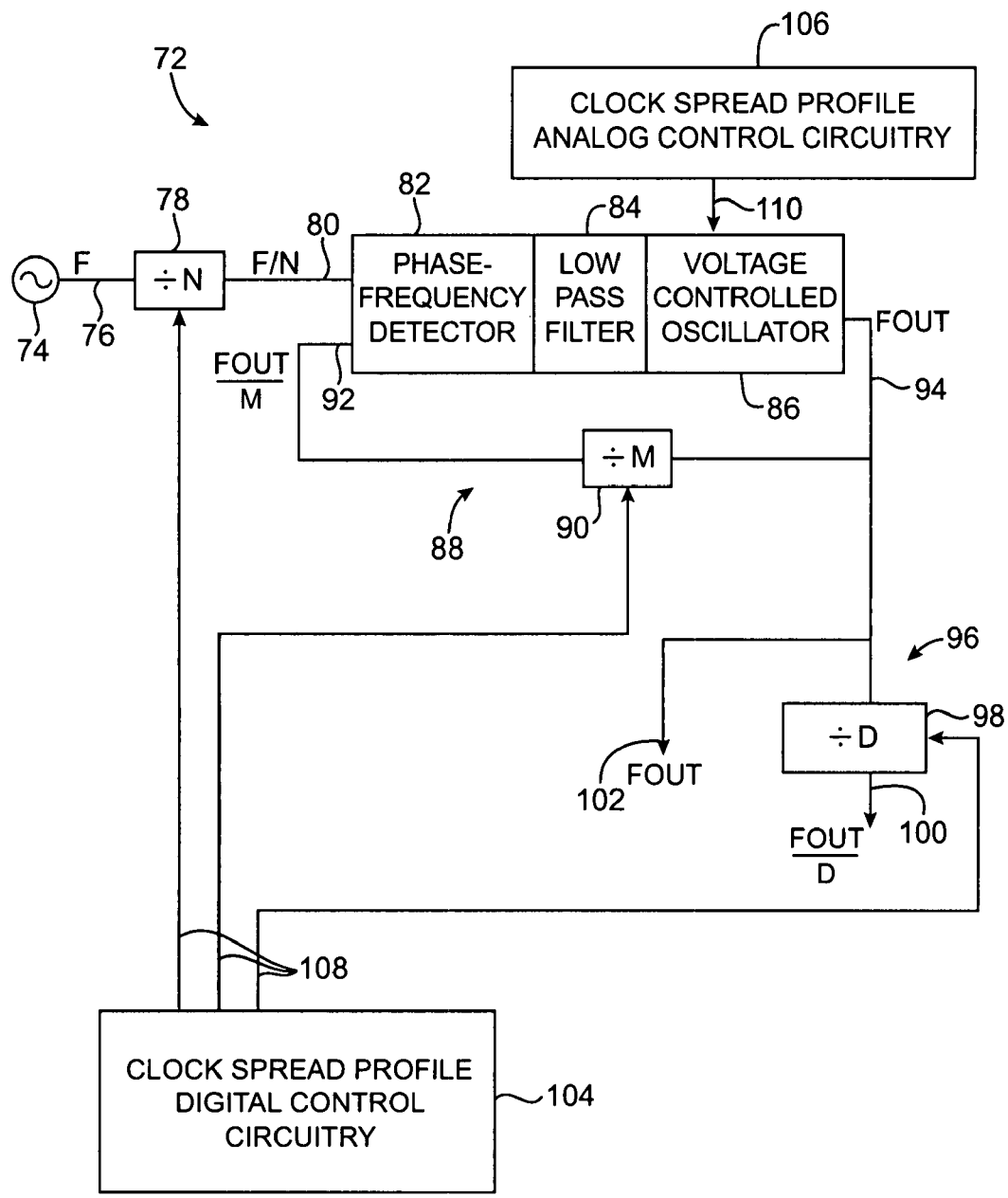
FIG. 6 is a diagram of circuitry including an illustrative adjustable clock source for use in an electronic device such as a handheld electronic device with radio-frequency communications circuitry in accordance with an embodiment of the present invention.

An illustrative adjustable clock source that is based on a phase-locked-loop design is shown in FIG. 6. As shown in FIG. 6, clock source 72 may receive a reference clock signal at frequency F from an oscillator or other reference clock source 74 over path 76. Optional divide-by-N circuit 78 may divide the reference clock to produce a corresponding signal at frequency F/N on path 80.

The phase-locked-loop circuitry in source 72 includes a phase-frequency detector 82, low-pass filter 84, and voltage controlled oscillator 86. An output clock signal is provided on output path 94 at frequency FOUT. The output signal is fed back to input 92 of the phase-locked-loop circuit via feedback path 88. Feedback path 88 contains an optional divide-by-M circuit 90 that divides the signal at frequency FOUT on line 94 to produce a divided signal at frequency FOUT/M at input 92. Phase-frequency detector 82 compares the signals on inputs 80 and 92 and issues corrective control signals to voltage-controlled oscillator 86. The control signals direct voltage-controlled oscillator 86 to adjust the output signal on line 94 until its phase and frequency match that of the reference input on line 80. In this matching condition (FOUT/M=F/N), the circuit is said to be locked and the output clock signal on output 94 will be stable and suitable for use in clocking components 68 (FIG. 5) on device 10.

The output clock signals from adjustable source 72 may be provided directly to components 68 using a path such as path 102. Alternatively, or in conjunction with supplying a signal on path 102, clock source 72 may supply a signal at frequency FOUT/D at output 100 using path 96, divide-by-D circuit 98. Dividers such as dividers 78, 90, and 98 may be controlled digitally. For example, a clock spread profile digital control circuit such as circuit 104 may be used to apply control signals to one or more of dividers 78, 90, and 98 to modulate the spectrum of the output clock signal on output paths 102 and 100, as described in connection with FIG. 4. Clock spread profile digital control circuitry 104 may apply control signals to dividers 78, 90, and 98 using paths such as paths 108. Paths 108 may be any suitable digital paths. For example, paths 108 may be digital control buses.

If desired, the clock spectrum associated with output clock signals on paths 102 and 100 may be modulated using an analog control circuit such as circuit 106. Circuit 106 can supply control signals (e.g., a modulated power supply signal) for voltage-controlled oscillator 86 on path 110. These control signals and the digital control signals from circuit 104 may be used to spread the clock signals that are produced by source 72 so that they cover a range of frequencies rather than a single fundamental frequency. This spreading effect may help to mitigate the effects of frequency collisions.

Figure 7:
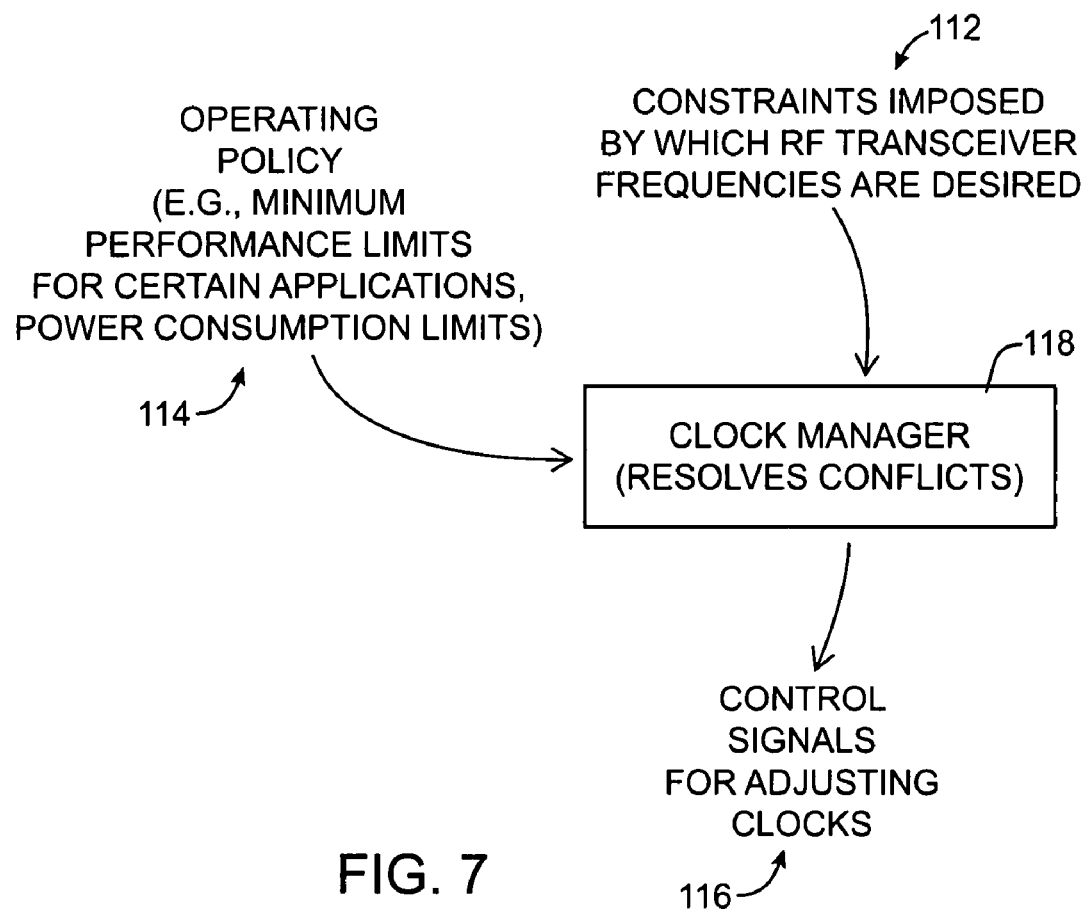
FIG. 7 is a diagram showing how a clock manager may make clock signal adjustments to minimize or avoid signal collisions taking into consideration constraints imposed by desired communications frequencies and desired operating policy constraints in accordance with an embodiment of the present invention.

Controller 62 of FIG. 5 may be used to implement a clock manager that dynamically resolves conflicts that arise from frequency collisions. As shown in FIG. 7, clock manager 118 may accept constraints 112 and operating policy information 114 as inputs and may produce corresponding control signals 116 for adjusting clocks such as the clocks of FIG. 5. Constraints 112 may be imposed by, for example, the desired operating frequencies of the radios in device 10.

Constraints 112 such as these are sometimes referred to as desired RF operating frequency constraints or RF transceiver constraints. In many circumstances, if the constraints imposed by the RF transceivers in device 10 cannot be satisfied, device 10 will not be able to satisfactorily perform its intended functions (e.g., supporting cellular telephone calls or data communications operations). These constraints are therefore sometimes given precedence over other, less restrictive, operating considerations.

Operating policy 114 may also impose limits on the behavior of clock manager 118. Examples of operating policy settings 114 include a setting to place device 10 in a low power consumption mode, a setting to place device 10 in a high performance mode, a setting to ensure that a particular software application (e.g., an application handling streaming audio and video) performs at an acceptable level without stuttering, a setting adjusting a display resolution or audio device quality level, etc.

The restrictions that are imposed by operating policy 114 and the restrictions imposed by RF transceiver constraints 112 may conflict with each other. For example, a setting that asks clock manager 118 to place device 10 in a low power mode may require clock manager 118 to throttle down a processor clock to a low frequency. At the same time, the user of device 10 may be placing a telephone call using a particular RF transceiver. If a harmonic of the processor clock falls within the communications band being used to handle the telephone call, clock manager 118 must decide whether to drop the call (or accept degraded call performance) or to override the desire for the low-power-mode setting by adjusting the processor clock upwards. If clock manager 118 decides to move the processor clock to a higher frequency (as an example), the clock harmonics associated with the processor clock can be moved out of the cellular band of interest, thereby improving wireless performance.

Clock manager 118 may always favor constraints 112 over the constraints imposed by policy 114 or may balance these two interests according to a weighting scheme. Clock manager 118 may also balance conflicts among constraints 112 (e.g., in determining which radio to favor when it is desired to operate multiple radios simultaneously) and among individual policy considerations (e.g., in determining whether to favor one application over another, etc.).

Figure 8:
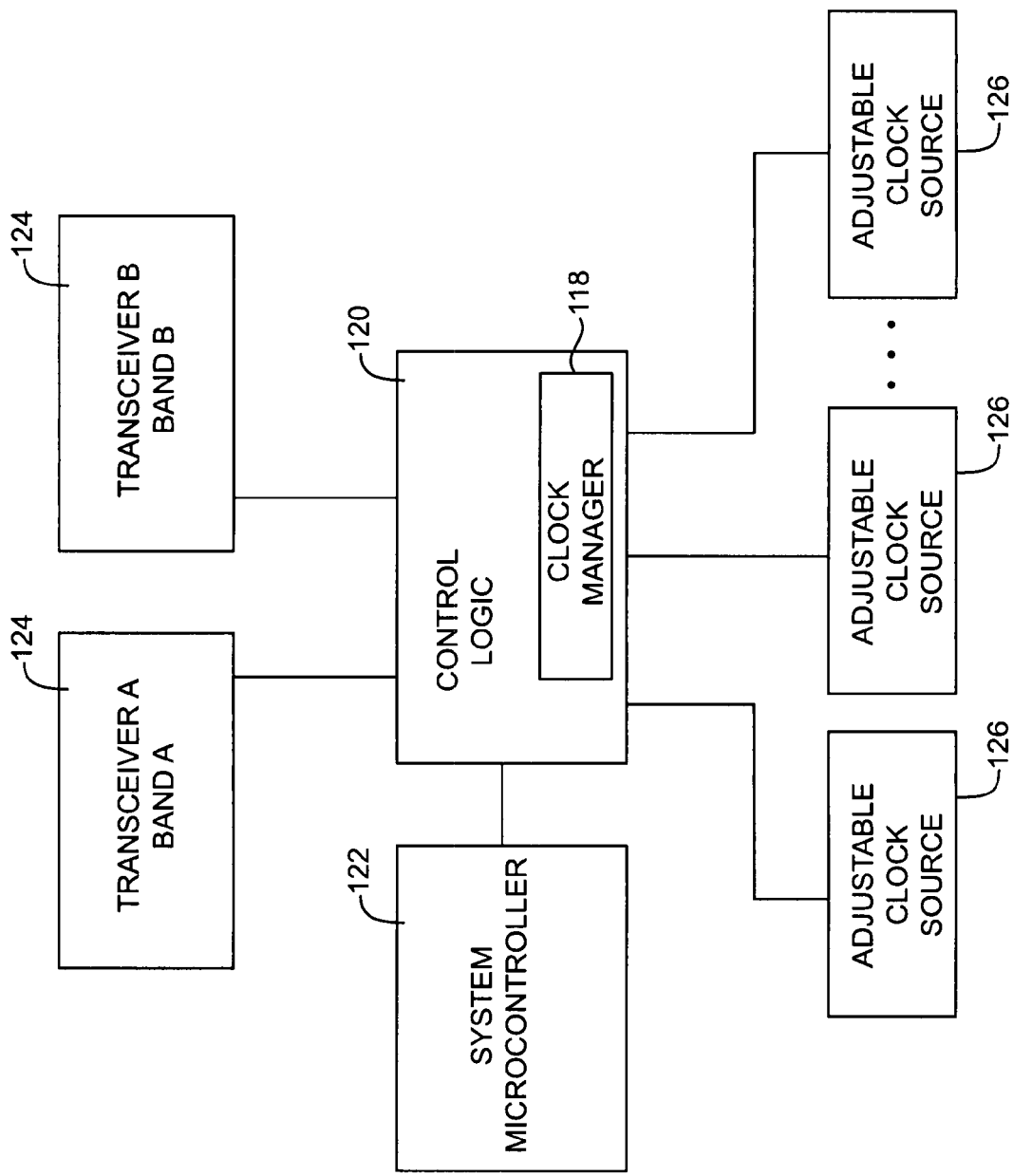
FIG. 8 is a diagram of circuitry in an electronic device with adjustable clock sources showing how a clock manager implemented in control logic may be used to avoid undesirable signal collisions in accordance with an embodiment of the present invention.

An illustrative implementation of a hardware-based clock manager 118 in device 10 that has a system microcontroller is shown in FIG. 8. As shown in FIG. 8, the electronic device may have control logic 120 in which clock manager 118 has been implemented. Control logic 120 may include dedicated control logic (e.g., control logic that implements a control state machine). One or more transceivers such as transceivers 124 or other electronic components may be coupled to control logic 120 (e.g., using signal buses). One or more adjustable clock sources 126 may also be coupled to control logic 120 (e.g., using signal buses). System microcontroller 122 may be used to control system functions such as power management functions, etc. System microcontroller 122 may provide status information that clock manager 118 may use in determining how to adjust adjustable clock source 126. As an example, system microcontroller 122 may inform clock manager 118 of the charge level associated with a battery. If the battery charge is high, clock manager 118 may not need to weight power management settings strongly. If the battery charge is low, clock manager 118 may weigh the power management settings more heavily.

Figure 9:
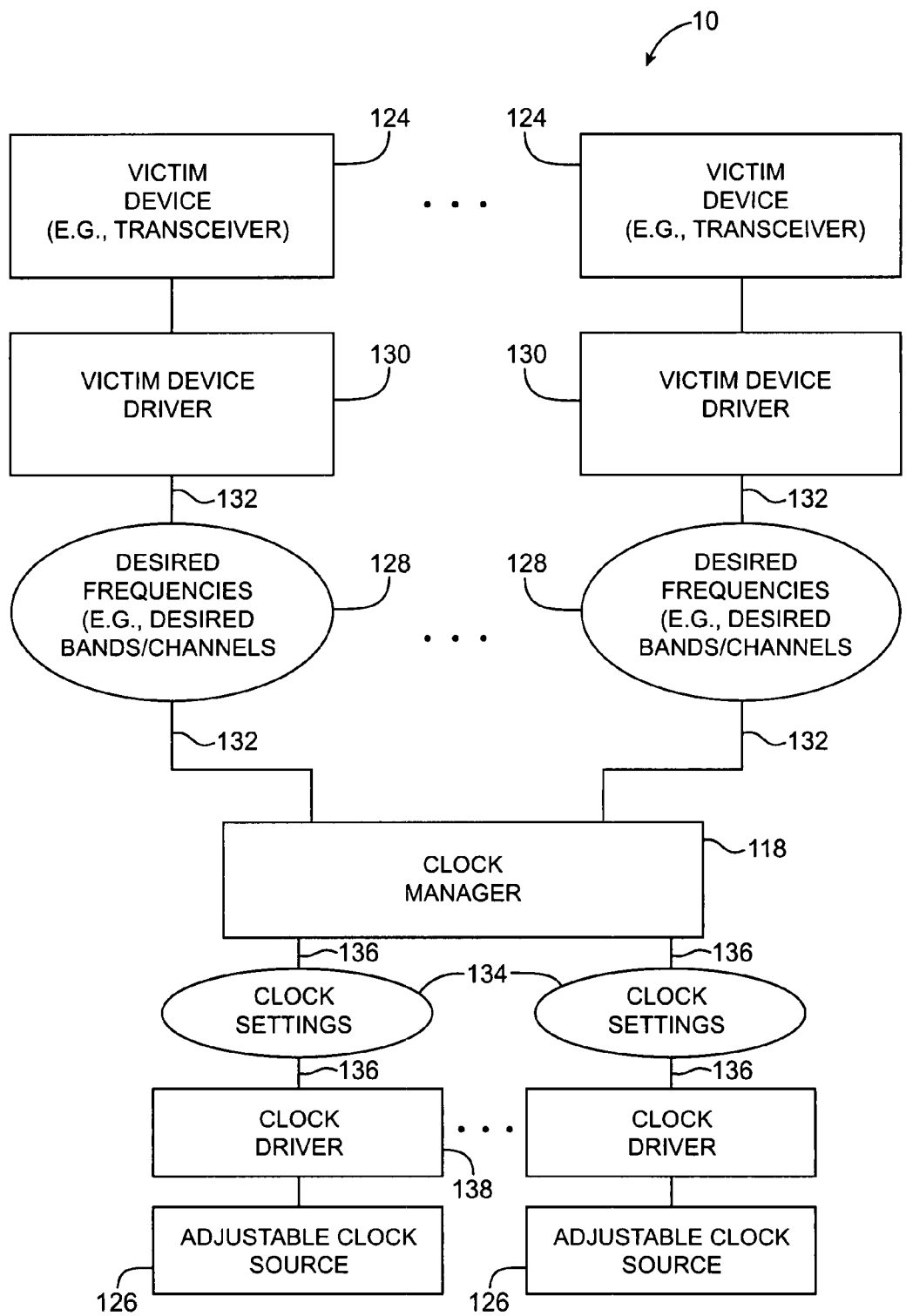
FIG. 9 is a diagram showing how a software-based clock manager may use device drivers and information on desired operating frequencies to avoid undesirable signal collisions in an electronic device in accordance with an embodiment of the present invention.

If desired, clock manager 118 may be implemented in software running on processing circuitry 36 (e.g., a general purpose microprocessor and memory, etc.). In this type of arrangement, drivers may be used to provide interfaces between devices such as radio-frequency transceivers and clock manager 118 and between clock manager 118 and adjustable clock sources. An illustrative configuration of this type is shown in FIG. 9. As shown in FIG. 9, clock manager 118 may communicate with components in device 10 such as victim devices 124. Victim devices 124 may be any suitable devices that may be adversely affected by interference from the clock signals produced by adjustable clock sources 126.

For example, victim devices 124 may be radio-frequency transceivers (e.g., cellular telephone and wireless data link transceivers).

Clock manager 118 may gather information 128 on which frequencies are desired by victim devices 124 using victim device drivers 130. As an example, victim devices 124 may publish information on which communications bands and channels are desired. This information may be provided periodically (e.g., once per minute), may be provided whenever an application has a change in status (e.g., when an email application needs to activate a data communications channel to receive email messages), may be provided on demand (e.g., when refreshed by a user), or may be provided using any other suitable scheme.

Device drivers 130 serve as an interface between the hardware of each victim device 124 and clock manager 118. For example, device drivers 130 may be used to communicate settings values from registers within devices 124 to clock manager 118 over communications buses (shown schematically as paths 132). These settings values and other data from devices 124 may indicate, for example, when a particular device needs to be enabled, when incoming data is expected or is being received, transmit and receive power status, signal quality, etc. Device drivers 130 may be used to convey data such as this from victim devices 124 to clock manager 118. Device drivers 130 may also be used to convey commands from clock manager 118 to devices 124. In a typical scenario, clock manager 118 may issue a control signal for a victim device (e.g., a transceiver) over a control bus (shown schematically as path 132). The command may be, for example, a command to make a settings adjustment, to enable or disable a transceiver, to request information from the transceiver, etc. The device driver that is associated with the transceiver may convert the command from the bus format used by the clock manager into a format that is recognized by the transceiver.

Clock manager 118 may provide clock settings 134 to adjustable clock sources 126 (e.g., over buses shown schematically as paths 136). Clock drivers 138 may be used to provide an interface between the hardware capabilities of each adjustable clock source 126 and clock manager 118.

Clock manager 118 may be implemented using any suitable software. For example, clock manager 118 may be implemented as part of an operating system (e.g., an operating system that controls the operation of a personal computer or a handheld electronic device). Clock manager 118 may also be implemented as an application (e.g., an application that runs in conjunction with an operating system). If desired, clock manager 118 may be implemented as a process that is invoked by other software (e.g., by an operating system, application, or other process). Combinations of these arrangements may also be used.

Figure 10:
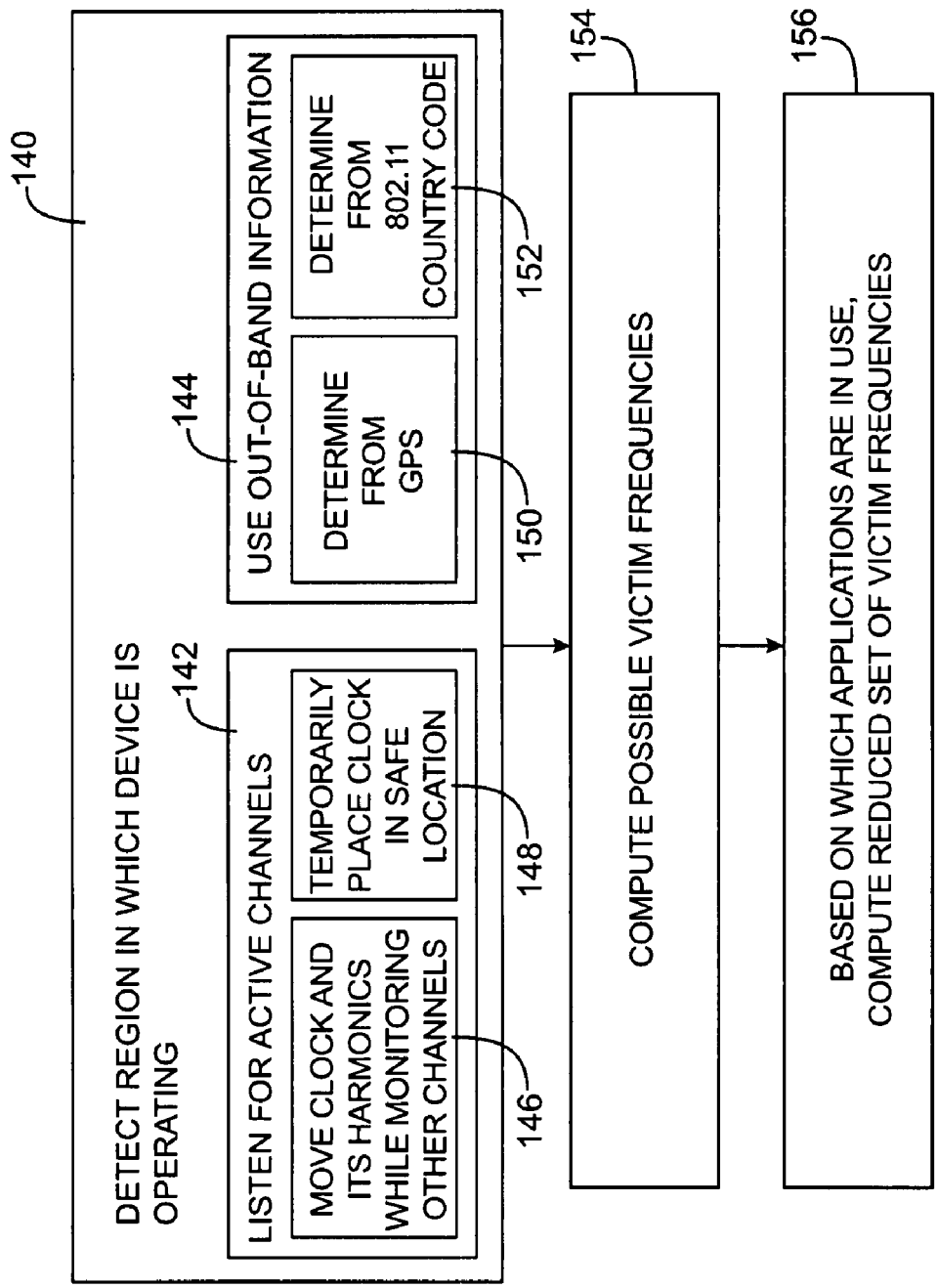
FIG. 10 is a flow chart of illustrative steps involved in using location information in an electronic device such as a handheld electronic device to avoid undesirable signal collisions in accordance with an embodiment of the present invention.

Illustrative steps involved in using a clock manager such as hardware-based clock manager 118 of FIG. 8 or software-based clock manager 118 of FIG. 9 in controlling device 10 are shown in FIG. 10. In the example of FIG. 10, the clock manager controls adjustable clocks such as adjustable clocks 126 of FIGS. 8 and 9 to avoid or minimize the potentially adverse impact of undesired frequency collisions. As described in connection with FIG. 7, the clock manager may make adjustments to the clock sources based on any suitable inputs including inputs related to desired transceiver settings (i.e., desired bands and channels of operation) and inputs related to operating policy considerations (e.g., whether device 10 is in power savings mode, whether a particular application has a high priority, etc.). With one particularly suitable arrangement, which is described herein as an example, the clock manager is provided with information on the current location of device 10. The location information may be used in determining how best to control adjustable clocks 126.

With this type of arrangement, clock manager 118 may detect the region in which device 10 is operating during step 140. Any suitable technique may be used to ascertain the current geographic location of device 10. As an example, clock manager 118 may listen for active communications channels (step 142). The frequencies that should be used for communicating with external equipment (e.g., the appropriate cellular telephone frequencies for device 10 to use) may not be known in advance. If a user travels between countries, the cellular networks with which device 10 communicates may change. In this type of environment, device 10 and clock manager 118 may not know which communications bands are appropriate to use. In step 142, clock manager 118 determines which communications frequencies are active and are therefore appropriate to use for supporting communications.

If desired, clock sources 126 may be left at nominal or default settings (or their last operative settings) during the process of listening for active channels (step 142). This approach may be satisfactory when there is only a moderate amount of interference between the clock harmonics produced by the clock sources and the radio-frequency transceivers associated with the wireless communications circuitry in device 10.

To ensure proper operation, it may be advantageous to minimize or eliminate potential interference during step 142.

With one suitable arrangement, the clock manager may adjust the clock sources so that the clock harmonics associated with the clock sources are moved to communications frequencies other than the one that is currently of interest (step 146). For example, clock manager 118 may be interested in determining if there is active communications traffic in a 900 MHz GSM cellular telephone band (indicating that this would be an appropriate band to use for cellular telephone communications and identifying the location of device 10 as being one in which 900 MHz communications are appropriate). To listen effectively for communications at 900 MHz, the clock manager may adjust the clock sources so that their harmonics overlap with the 850 MHz cellular telephone band. Because only the 900 MHz band is being monitored (in this example), a frequency collision between a clock harmonic and the 850 MHz cellular telephone band during the operations of step 146 will not prevent device 10 from determining whether there is active traffic in the 900 MHz band.

With another suitable arrangement, clock manager 118 temporarily adjusts the clock to clear harmonics from the band of interest (step 148). In this type of scenario, the clock may be placed in a safe frequency band. The clock may be adjusted, for example, so that its harmonic frequencies do not overlap with any cellular telephone bands that are supported by device 10 (e.g., by lowering the clock to its maximum power saving level).

Based on the operations of steps such as steps 146 or 148, clock manager 118 may determine the location of device 10 (e.g., whether device 10 is in a jurisdiction that supports 900 MHz cellular telephone communications or whether device 10 is in a jurisdiction that supports 850 MHz cellular telephone communications).

If desired, out-of-band information may be used to ascertain the location of device 10 (step 144). For example, clock manager 118 may obtain global positioning system (GPS) coordinates from a GPS receiver in device 10 (step 150) or may determine the current geographic location of device 10 from IEEE 802.11 country code information received by circuitry in wireless communications circuitry 44 of FIG. 2

(step 152). As another example, a user may inform device 10 of its location using its user interface. Techniques such as these may be used to obtain geographic location information at any suitable level of detail (e.g., country location information, state location information, city location information, etc.).

At step 154, clock manager 118 may compute possible victim frequencies associated with the victim devices in device 10. For example, a cellular telephone transceiver may be associated with a particular communications band or bands or a range of one or more channels in one or more communications bands. During step 154, clock manager 118 may generate a list of frequencies (ranges) in which the RF transceivers may possibly operate. For optimal device operation, these operating frequencies (i.e., the cellular telephone bands that the RF transceivers cover) should be as free as possible from interference from clock source harmonics. The list of possible victim frequencies may be stored in storage 34 of device 10.

During step 156, clock manager 118 may compute a reduced set of victim frequencies (ranges) based on which applications are in use in device 10. For example, if device 10 is being used in a country in which a 900 MHz cellular telephone band is in operation but an 850 MHz band is not in operation, clock manager 118 may remove the frequencies associated with the 850 MHz band from the list of possible victim frequencies. As another example, consider a situation in which an application on device 10 is performing data downloading operations using a data communications channel, but is not using any cellular telephone communications functions. In this situation, clock manager 118 may conclude that the frequency bands associated with the cellular telephone bands need not be included in the set of victim frequencies. By eliminating unused victim frequencies from the list of victim frequencies, clock manager 118 may reduce the constraints imposed on device 10. Once the reduced set of victim frequencies has been computed during step 156, clock manager 118 can adjust clock sources 126 to eliminate or at least minimize aggressor frequency collisions with the reduced set of victim frequencies.

Figure 11:
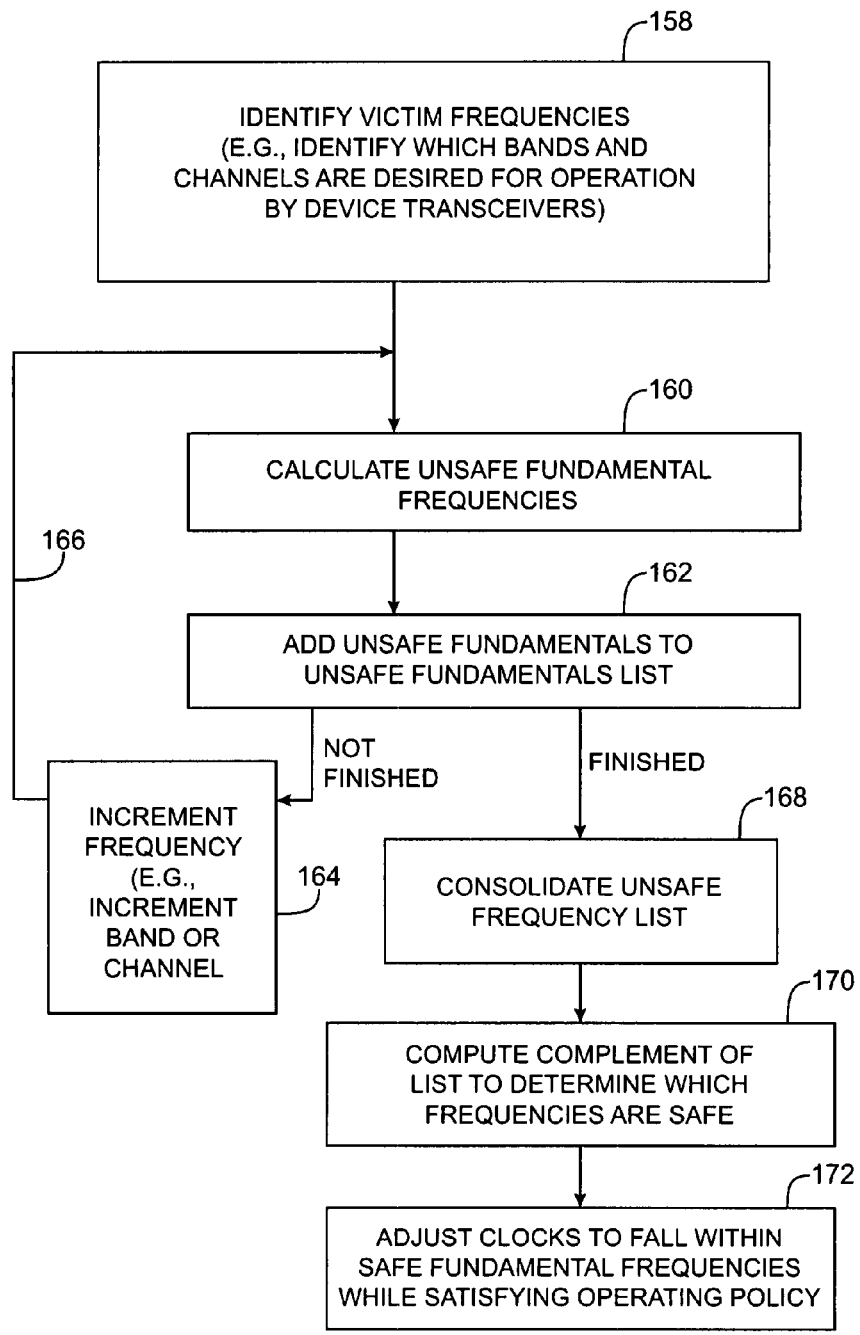
FIG. 11 is a flow chart of illustrative steps involved in identifying appropriate clock frequencies to avoid undesirable signal collisions in an electronic device and in controlling corresponding adjustable clock sources in the electronic device in accordance with an embodiment of the present invention.

Illustrative steps involved in using clock manager 118 to adjust clock sources 126 are shown in FIG. 11.

At step 158, clock manager 118 may identify victim frequencies in device 10. A list of victim frequencies may be generated using operations such as the operations described in connection with FIG. 10. During step 158, possible victim frequencies may be eliminated based on information on user-supplied settings, based on which applications are running in device 10, based on external data (e.g., time of day, etc.) based on the location of device 10, or based on any other suitable input data.

At step 160, clock manager 118 may begin to compute a list of unsafe fundamental frequencies. This list represents the frequencies (ranges of frequencies) that should be avoided by clock sources 126. If a clock source has a fundamental harmonic at one of these frequencies, a possibility for undesirable interference between the harmonics of the clock signal and the victim frequencies in the list of step 158 may exist.

If desired, the frequency computations of step 160 and 162 may be performed on a band-by-band or channel-by-channel basis. With this type of arrangement, steps 160 and 162 may be performed for each frequency of interest (i.e., each frequency in a range bounded by a minimum possible clock frequency and a maximum possible victim frequency). Each time steps 160 and 162 are executed, the frequency at which the computations are being performed is incremented at step 164. Control then loops back to step 160, as indicated by line 166. Once all frequencies have been covered, clock manager 118 may proceed to step 168.

At step 168, the list of unsafe frequencies that was computed during the repeated operations of steps 160 and 162 may be consolidated. In particular, a master list of unsafe clock signal fundamental frequencies may be generated. This list may be stored in storage 34 (FIG. 2).

At step 170, clock manager 118 may compute the complement of the list from step 168. In particular, clock manager 118 may compute which frequencies are considered to be safe by inverting the list of unsafe clock frequencies.

At step 172, clock manager 118 may adjust clock sources 126 to ensure that the clock signals that are output from the clock signals fall within the list of permissible clock frequencies. During step 172, clock manager 118 may balance the desire to avoid frequency collisions with operating policies for device 10, as described in connection with FIG. 7. Clock manager 118 may, as an example, avoid placing clock signals at any frequencies that are not contained within the safe frequency list. The safe and unsafe frequency lists may be formed using any suitable format. For example, the lists may contain individual safe and unsafe frequency values or safe and unsafe frequency ranges.

The foregoing is merely illustrative of the principles of this invention and various modifications can be made by those skilled in the art without departing from the scope and spirit of the invention.

What is claimed is:

1. A method for controlling frequency collisions in an electronic device that has at least one victim device and at least one adjustable clock source, comprising:
    detecting a geographical location in which the electronic device is operating by monitoring which communications bands are active;
    with a clock manager implemented on the electronic device, identifying a list of safe frequencies at which to operate the adjustable clock source based on the geographical location so that clock signal harmonics associated with the clock source do not interfere with the victim device;
    with the clock manager, adjusting the adjustable clock source to produce a clock signal having a fundamental frequency that falls within the list of safe frequencies; and
    prior to detecting the geographical location, temporarily adjusting the adjustable clock to prevent the clock signal harmonics associated with the clock source from interfering with the victim device.

2. The method defined in claim 1 wherein identifying the list of safe frequencies comprises:
    generating a list of victim frequencies associated with operation of the victim device; and
    computing a complement of the list of victim frequencies.

3. The method defined in claim 1 wherein identifying the list of safe frequencies comprises:
    for a plurality of victim devices in the electronic device, computing possible victim frequencies; and
    based on which applications are in use on the electronic device, computing a reduced set of victim frequencies from the possible victim frequencies.

4. The method defined in claim 1 wherein the electronic device comprises a portable device and wherein detecting the geographical location comprises using global positioning system data to determine the geographical location.

5. A method for controlling frequency collisions in an electronic device that has at least one victim device and at least one adjustable clock source, comprising:
- with the electronic device, detecting a location in which the electronic device is operating using country code data;
- with a clock manager implemented on the electronic device, identifying a list of safe frequencies at which to operate the adjustable clock source based on the location so that clock signal harmonics associated with the adjustable clock source do not interfere with the victim device; and
- with the clock manager, adjusting the adjustable clock source to produce a clock signal having a fundamental frequency that falls within the list of safe frequencies, wherein identifying the list of safe frequencies based on the location comprises:
  - generating a list of victim frequencies associated with operation of the victim device;
  - generating a list of unsafe frequencies based on the list of victim frequencies; and
  - inverting the list of unsafe frequencies to obtain the list of safe frequencies.

6. The method defined in claim 1 wherein the electronic device comprises a portable device and wherein monitoring which communications bands are active comprises monitoring a given communications band for activity, the method further comprising adjusting the fundamental frequency of the adjustable clock source to avoid overlap between harmonic frequencies associated with the clock signal and the given communications band while monitoring the given communications band for activity.

7. An electronic device comprising:
- wireless communications circuitry that operates in at least one communications band;
- at least one adjustable clock source that includes a phase-locked loop circuit and that produces a clock signal, wherein the phase-locked loop circuit includes at least one frequency divider and clock spread profile control circuitry operable to apply control signals to the at least one frequency divider for adjusting the clock signal;
- circuitry with which a clock manager is implemented, wherein the clock manager dynamically adjusts the adjustable clock source to prevent harmonics of the clock signal from interfering with the communications band; and
- a user interface operable to receive location data from a user, wherein the clock manager dynamically adjusts the adjustable clock source at least partly based on the location data.

8. The electronic device defined in claim 7 further comprising a plurality of adjustable clock sources, each of which is adjusted by the clock manager to avoid interference between harmonics of clock signals from the adjustable clock sources from interfering with the wireless communications circuitry.

9. The electronic device defined in claim 7 further comprising a system microcontroller that provides information to the clock manager, wherein the clock manager uses the information from the system microcontroller in adjusting the adjustable clock source.

10. The electronic device defined in claim 7 further comprising a processor on which the clock manager is implemented, wherein the electronic device further comprises a clock driver that is used by the clock manager in adjusting the adjustable clock.

11. The electronic device defined in claim 7 wherein the electronic device comprises a handheld electronic device.

12. The electronic device defined in claim 7 wherein the wireless communications circuitry comprises at least one cellular telephone radio-frequency transceiver.

13. The electronic device defined in claim 7 wherein the wireless communications circuitry comprises radio-frequency transceiver circuitry that operates in a plurality of cellular telephone frequency bands at least one of which is active, the electronic device further comprising:
- a plurality of adjustable clock sources, wherein the clock manager controls each of the adjustable clock sources to prevent overlap between harmonic frequencies associated with clock signals from the adjustable clock sources and the active cellular telephone frequency band.

14. A method for controlling a handheld electronic device having at least one radio-frequency transceiver and at least one adjustable clock source that produces a clock signal, wherein the radio-frequency transceiver is operable in multiple frequency bands, comprising:
- with the handheld electronic device, detecting a location in real time in which the electronic device is operating using country code data;
- determining a frequency range that is associated with communications handled by the radio-frequency transceiver based on the location;
- dynamically adjusting the adjustable clock source to prevent harmonic frequencies of the clock signal from overlapping the frequency range; and
- prior to detecting the location, temporarily adjusting the adjustable clock source to prevent harmonic frequencies of the clock signal from overlapping the multiple frequency bands.

15. The method defined in claim 14 wherein the electronic device comprises a plurality of components, each of which has at least one associated operating frequency, the method further comprising:
- dynamically adjusting a plurality of adjustable clock sources within the handheld electronic device so that harmonic frequencies associated with clock signals from the adjustable clock sources do not collide with the operating frequencies of the plurality of components.

16. The method defined in claim 14 wherein the clock signal produced by the adjustable clock source comprises a processor clock signal for a processor within the electronic device, the method further comprising adjusting the processor clock signal to reduce power consumption in the electronic device in accordance with user settings.

* * * * *